United States Patent Office 3,440,549
Patented Apr. 22, 1969

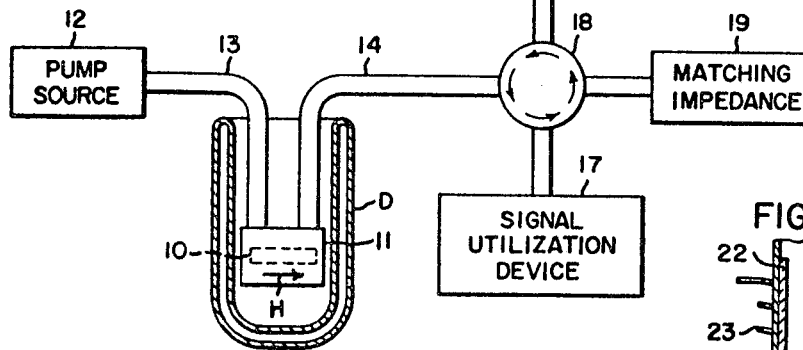
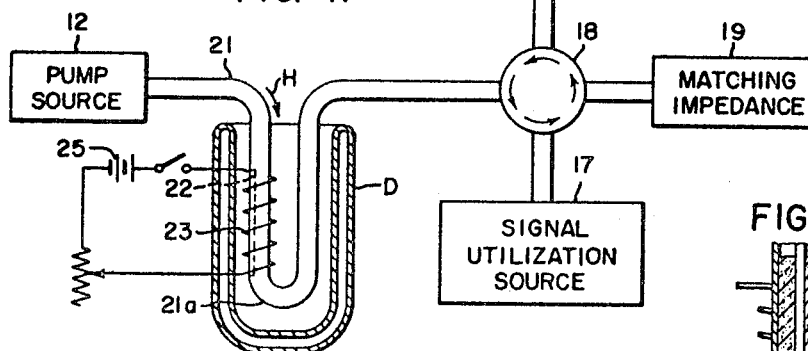
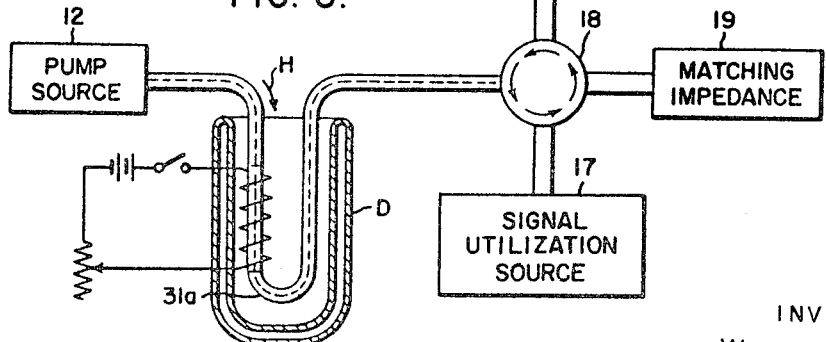

3,440,549
WIDE BANDWIDTH MILLIMETER MASER
Wayne E. Hughes, Glen Burnie, Md., assignor to Westinghouse Electric Corporation, Pittsburgh, Pa., a corporation of Pennsylvania
Continuation-in-part of application Ser. No. 442,967, Mar. 26, 1965. This application Mar. 9, 1967, Ser. No. 621,824
Int. Cl. H01s 1/02
U.S. Cl. 330—4
11 Claims

ABSTRACT OF THE DISCLOSURE

A broad band maser is described in which the maximum amplifying bandwidths may be increased by orders of magnitude by utilizing negative temperature media that have at least three discrete metastable states and are therefore capable of continuous wave maser operation. The orientation of the electron spins of some crystals give discrete energy levels. In general, the energy levels are functions of the host crystalline field orientation and the magnitude of any external magnetic field present. If such material is used in powdered form the crystal axes then have completely random orientations. By applying a magnetic field to such polycrystalline material the energy levels will be split into a continuum and the number of allowable transitions frequencies are greatly increased and the bandwidth of operation is increased accordingly. Two or more polycrystalline (powdered) media are mixed together to get a larger bandwidth. The specific materials used are $Fe^{3+}$ doped $ZnWO_4$ and $Fe^{3+}$ doped $TiO_2$. Other materials that may be used are $Fe^{3+}$ in $MgWO_4$, $CdWO_4$ and $CaWO_4$. Also two different kinds of dopant ions may be incorporated into the same crystalline host.

---

This is a continuation-in-part of my application Ser. No. 442,967, filed Mar. 26, 1965, and now abandoned.

In applicant's copending application Ser. No. 232,060, filed Oct. 22, 1962, now Patent No. 3,210,674, for maser, there is described and claimed a multilevel solid state maser using a solid crystal of rutile, which is titanium oxide $TiO_2$, doped with ion ($Fe^{3+}$) ions. In that apparatus, a doped rutile crystal is immersed in a homogeneous magnetic field of very high density in order to split the ground states and means is provided for very carefully and precisely orientating the crystal optic axis with respect to the magnetic field in order to properly space the energy states to provide suitable allowed transitions for accomplishing novel maser operation.

In FIG. 1 of that application, it is clearly illustrated that when a magnetic field of very high density is applied to a single crystal of rutile very discrete energy levels are produced. In the embodiment illustrated in that figure, the density of the magnetic field is chosen in the neighborhood of between 7 to 8 kilogauss since it is desired that the difference between energy levels $W_1-W_3$, $W_2-W_4$, and $W_3-W_5$ be equal. In that figure, it is to be noted that the energy levels are all very discrete and therefore the amplifying bandwidth which, for example, might correspond to the frequency between $W_5$ and $W_2$ is limited to the resonant line transitions of stimulated emission between these two states.

In that application, the magnitudes of the external magnetic field, as well as the orientation of the optic axis of the crystal with respect to the magnetic field is chosen so that the relatively sharp resonant lines of the split ground states are properly spaced to permit energy transitions in both directions in order to produce the desired mode of operation. The output frequency is then necessarily limited to the parameters that must be so chosen to fit the allowed states of transition. FIG. 1 illustrates the mode of operation in that copending application where the non-adjacent energy levels are equally spaced so that at a selected density of external magnetic field the same pump frequency $f_p$ will effect transitions upwardly between non-adjacent energy levels $W_1-W_3$, $W_2-W_4$ and $W_3-W_5$. The transitions downwardly are then those that are determined by the lifetimes of the narrow resonant lines.

Maser materials having multiple zero-field splittings are mentioned in pp. 489–492 of "Microwave Solid-State Masers" by Siegman, published by McGraw-Hill in New York in 1964. However, in that book it very clearly points out that operation is limited to the frequency, or frequencies, fixed by the zero-field splitting in any given maser material. At p. 492, it is pointed out that the advantage of zero-field maser is the freedom from any magnetic field (external) requirement. It is further pointed out there that an additional advantage is that materials requirements are also relaxed so that poly-crystals, or powders, may be used as well as single crystals. There is no teaching there that an external magnetic field can be applied to get maser operation between a wide range of levels of the zero-field splittings.

The Siegman reference, at p. 489 also refers to previous work by King and Terhune who operated a near zero-field maser using iron-doped sapphire. The work of the latter is reported in the Journal of Applied Physics, volume 30 (1959), at p. 1844. King et al. reported that iron-doped $Al_2O_3$ had been operated successfully as an amplifier at 12.3K mc. using only a very small field for tuning. In that case "the crystalline electric field splits and mixes the spin states in a manner suitable for 3-level maser action without a magnetic field present." This must be interpreted as being "any substantial external magnetic field" because the next sentence indicates that "With other presently used materials, one has to use a large D.C. magnetic field to obtain a similar situation." In that instance the C-axis of the crystal was aligned with the small external magnetic field to produce six levels similar to that shown in FIG. 1 as representing the prior art.

This invention relates to improvement in stimulated emission of radiation amplifier apparatus.

It is well understood that a maser employs an active medium either gaseous, liquid or solid, in which there can be established by "pumping action" at least intermittently a nonequilibrium population distribution in at least a pair of the spaced energy states of its electrons with the electrons in the higher states having the greater population. This "pumping" process is also called "state separation." In this non-equilibrium state, the medium is said to have a negative temperature.

This type of amplifier has reached a well recognized status but there are two areas in particular where improvements in their applications are desirable. These amplifiers require a source of pumping energy of relatively high power output and of high frequency. Such pumping sources are usually bulky and expensive. State of the art amplifiers of this type also are usually restricted to narrow bandwidths. The maximum bandwidth of maser amplifiers is on the order of 10 to 30 megacycles.

It is usual to operate masers in which the ground states are split by immersing the active medium in a precisely oriented magnetic field. The orientation of the electron spins, which correspond to energy levels, are functions of the angles between the axis of symmetry of the crystal and the direction of the magnetic field. The rules of quantum electronics allow only certain orientations of the electron spins. Accordingly, the quantum electronic rules determine the allowable transitions in both directions and therefore determine the frequency of operation.

The orientation of the electron spins of some crystals give discrete energy levels in the absence of an external magnetic field. The principle of operation of the present invention is based on the fact that the energy levels are a function of the host crystalline field orientation and the magnitude of an applied magnetic field. In accordance with the present invention powdered active material is used instead of the single crystal material conventionally used in masers. In the powdered material, the crystal axes have random orientation. If a slight external magnetic field is applied to such material, having discrete energy levels without an external magnetic field, the energy levels will be split into a continuum and the number of discrete frequencies at which transitions are allowed is greatly increased and the bandwidth will be increased correspondingly. Accordingly, the primary object of the invention is to provide a novel and improved maser having increased bandwidth capabilities.

A still further object is to provide an improved maser apparatus capable of operating in the low millimeter wave region which will eliminate the necessity for the critical adjustment of the optic axis of the crystal of the active medium with respect to the magnetic field.

The invention, both as to its organization and method of operation, as well as additional objects and advantages will best be understood from the following description when read in connection with the accompanying drawings, in which:

FIG. 3 is a schematic circuit diagram of an illustrative embodiment of a maser in accordance with the present invention;

FIG. 4 is a modified embodiment of the invention;

FIG. 5 is a sectional view on line V—V of FIG. 4 looking in the direction of the arrows;

FIG. 6 is a further modified form of the invention;

FIG. 7 is a cut-away profile sectional view of FIG. 6; and

Figure 1:
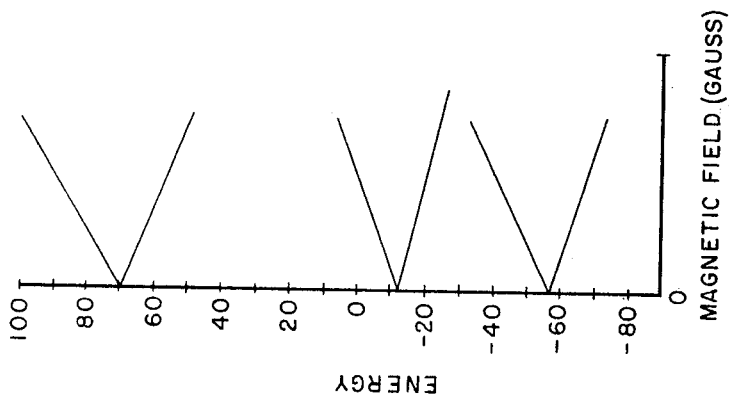
FIGURE 1 is an energy level diagram for the ground states of a single crystal of a maser medium as used in prior art devices.
Figure 2:
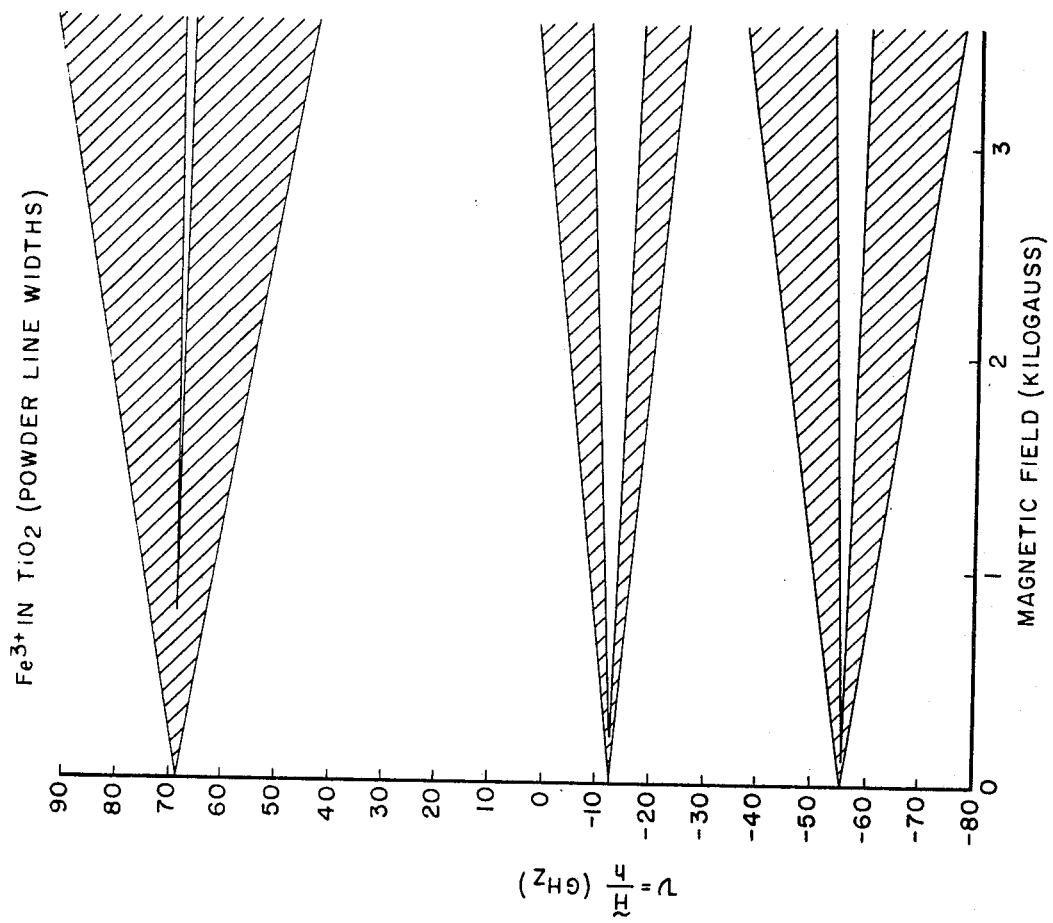
FIG. 2 is an energy diagram for a body of the same medium in powdered form.

In contrast to the energy levels of the prior art llustrated in FIG. 1 of this application a continuum of energy levels produced in accordance with the present invention is illustrated in FIG. 2. As was previously mention, when a maser is operated without an external magnetic field there is no crystalline angular orientation dependence and therefore crystals having optic axes at completely random orientation may be utilized. Since the orientation of the electron spins, corresponding to energy states, are functions of the angles between the optic axis and the external magnetic field a large number of crystals at random orientation will produce a wide band of energy levels as distinguished from the few discrete levels indicated in FIG. 1. The most convenient means for providing random orientation of crystals is the utilization of crystals in powdered form which may be placed in a liquid vehicle or may be adhered together with a suitable binder and formed into a rigid body. By "powdered crystals" is meant a polycrystalline structure which may be produced by crushing single crystals. The degree of fineness is not critical as this only determines the distribution of discrete lines of the energy spectrum.

Utilizing such powdered crystals, a continuum of energy levels can be obtained as indicated in FIG. 2. In order to operate a single field continuous wave maser amplifier, it is necessary that a connective paramagnetic ion be provided whose effective spin is equal to 1, 3/2, 2, or greater and it is necessary that the spin energy levels be split by the surrounding ions so that there are at least three separate levels. It is also necessary taht the states be mixed so that pumping between non-adjacent levels can be accomplished.

From FIG. 1 it is seen that for a zero external magnetic field, a crystal such as titanium oxide doped with iron ions ($Fe^{3+}$, $TiO_2$) for example, has three energy levels in zero magnetic field. As soon as an external magnetic field is applied, these energy states are split and the manner in which these energy states diverge as the magnetic field is increased is a function of the orientation of the crystal axis, as shown in FIG. 2. With a plurality of crystals, as in the powdered form, the three levels are spread out for each angle of orientation. The divergence from the three zero levels is also a function of the random orientation of the powdered crystals thus resulting in the almost completely random distribution of energy levels so that there is substantially a continuum of levels as illustrated in FIG. 2.

FIGS. 3 to 6, inclusive, illustrative various ways in which a powdered maser medium may be incorporated into a maser amplifier. The powdered crystals, may be held in sinter block 10 adhered together by ceramic material. The block 10 may be mounted by any suitable means in a resonant microwave cavity 11. The cavity 11 is a part of a microwave signal translation system which includes a pump source oscillator 12, a waveguide section 13 between the pump source and the cavity 11 and another section of waveguide 14 between the cavity and the signal source 16 and the output utilization device 17. In accordance with well known practice, the signal source 16 is connected to the utilization device 17 through a circulator 18 by suitable means so that the waveguide 14 transmits the input signal to the cavity 11 where amplification of the signal takes place by reason of the stimulated emission of radiation from electrons of the block 10 of powdered maser medium which have been excited to appropriate level or levels by the output of the pump source 12. Conventional matching impedance 19 reduces any mismatch between the connections of the circulator.

In FIGS. 4 and 5, a modified form of the invention is illustrated, where, instead of the block 10 and the resonant cavity 11 of FIG. 3, a rectangular microwave guide 21 has a U-shaped loop 21a extending into and out of a conventional Dewar D and a slab of sintered powdered crystal 22 is suitable supported against one of the broad inside faces of the guide 21 as illustrated in FIG. 5. Any suitable means, not shown, may be provided for immersing the slab 22 in a low density magnetic field, represented by the arrow H. Since the direction of the magnetic field is immaterial, the field could be created by a coil 24 energized by a DC source 25 and surrounding the portion of the waveguide 21 in which the slab 22 is positioned. Alternatively, the magnetic field H could be provided by a superconducting magnetic field since the maser medium is necessarily positioned in a refrigerated Dewar.

As in the previous embodiment, the signal from source 16 is amplified by reason of the stimulated emission of radiation from the electrons of medium in slab 22 which have been excited to upper energy levels by the pumping energy from pump source 12.

In the further modified form of FIG. 6 and FIG. 7, a coaxial cable 31 connects the pump source 12 to the signal source 16 and the utilization device 17. In this embodiment, the coaxial cable 31 has a loop 31a in the Dewar D. A portion of the length of the loop in the Dewar is filled with the powdered maser medium, as illustrated in FIG. 7. As in the previous embodiments above, suitable means may be provided for establishing a low density magnetic field H through the medium.

Figure 8:
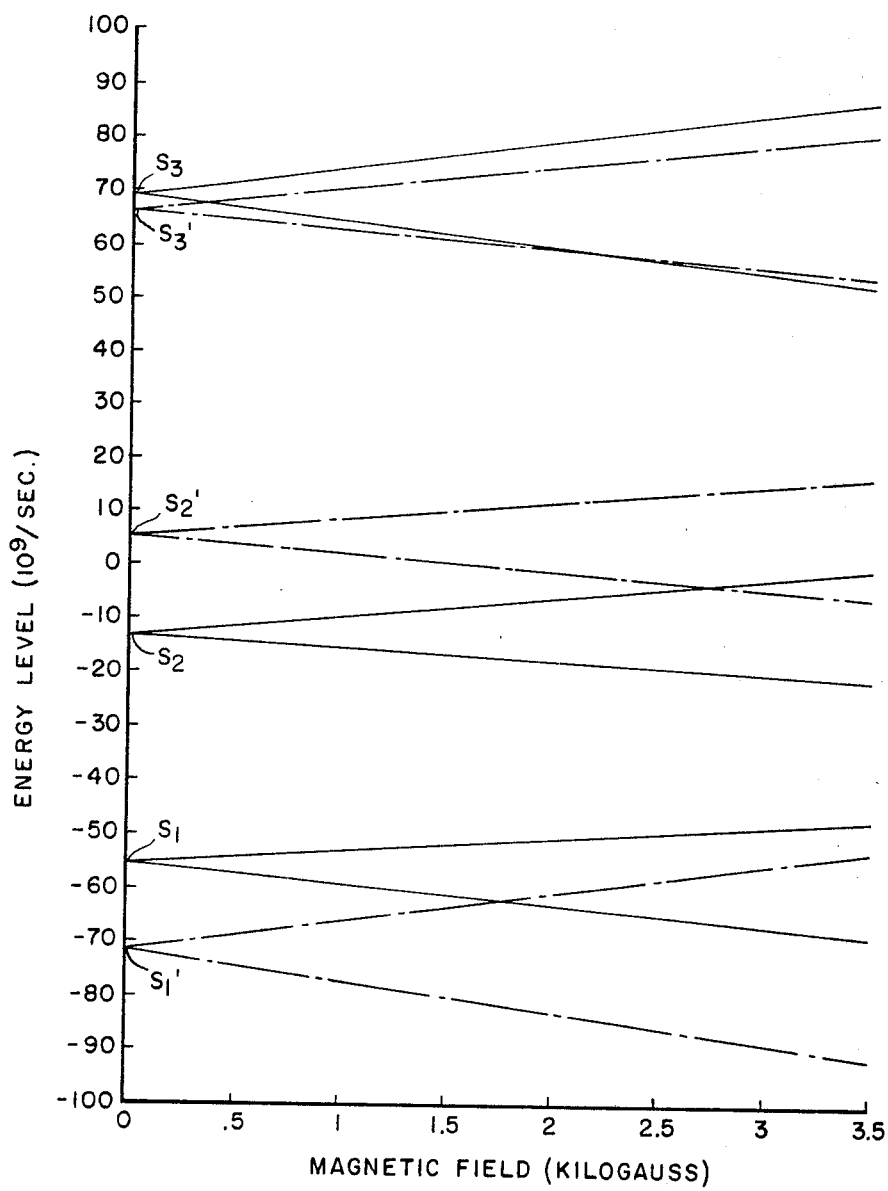
FIGS. 8 and 9 are energy level diagrams, similar, respectively, to FIGS. 1 and 2, illustrating how the bandwidth can be enhanced by intermixing different powdered active media.
Figure 9:
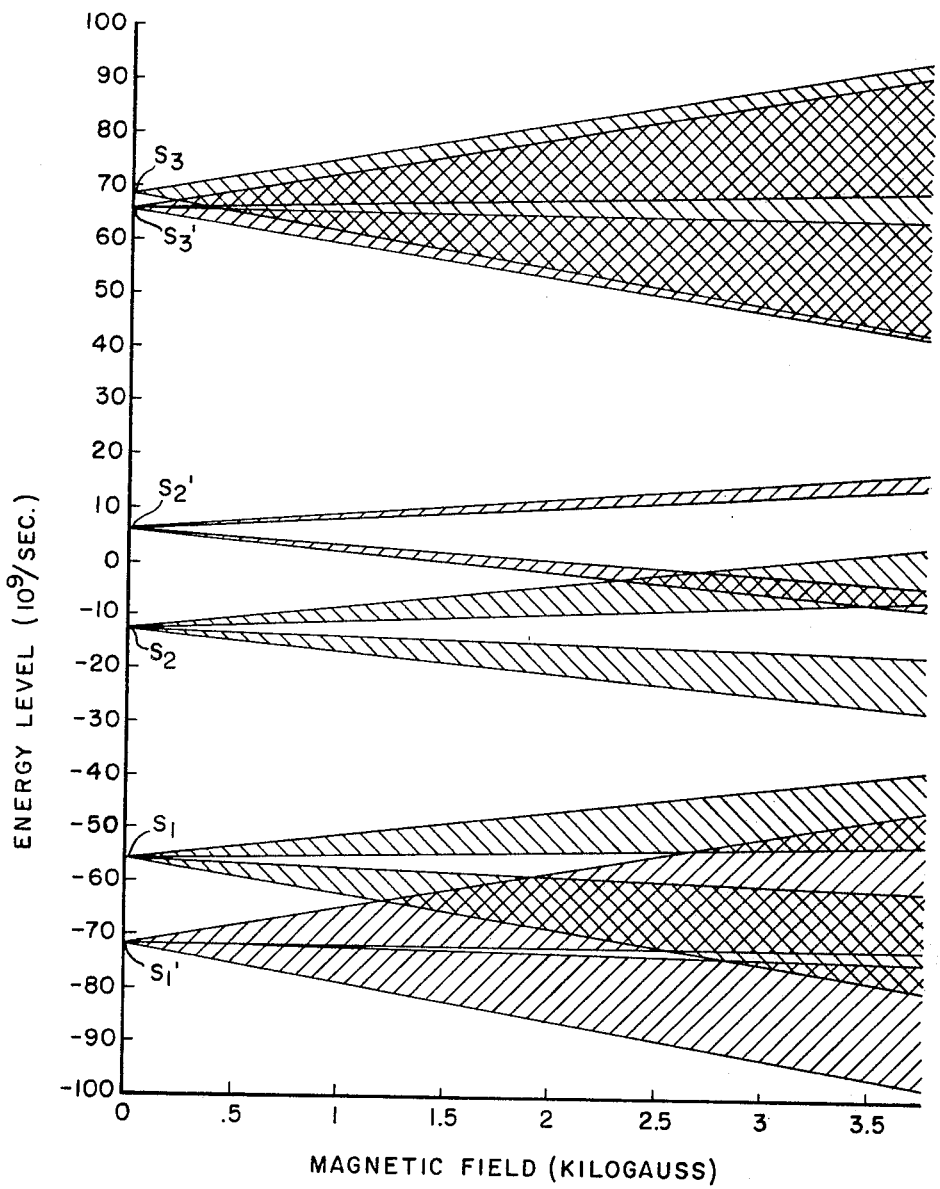

In order to provide an even larger bandwith, two or more materials which have at least three ground states may be powdered and mixed together to produce an enlarged spectrum of frequencies as illustrated in FIGS. 8 and 9.

For example, in FIG. 8 states $S_1$, $S_2$ and $S_3$ may represent the three ground states in zero magnitude field for $Fe^{3+}$ doped $TiO_2$ similar to that illustrated in FIG. 1. States $S'_1$, $S'_2$ and $S'_3$ may represent the corresponding levels for $Fe^{3+}$ doped $ZnWO_4$. When a low density magnetic field is applied, these ground states will be split and since they diverge from different points and/or overlap, a wider continuum of energy levels will be provided, the increase in bandwidth being indicated by the cross hatched areas in FIG. 9.

When iron-doped rutile ($TiO_2$:$Fe^{3+}$) at substantially 2.4° K. at zero external field was pumped at 124 gc./sec. between levels 1 and 3 amplification was obtained between levels 3 and 2 at 81.37 gc./sec. When iron doped zinc tungstate ($ZnWO_4$:$Fe^{3+}$) was similarly pumped in zero field at 140 gc./sec. maser amplification was obtained at 78 gc./sec. A mixture of these materials in polycrystalline form in a slight-magnetic field would provide a wide spectrum of energy levels for maser amplification.

In the above example, two separate pumping sources would be required but since the amplified frequencies would overlap a continuous bandwidth represented by the divergent line width.

With other materials, such as $MgWO_4$, $CdWO_4$ or $CaWO_4$ doped with iron ($Fe^{3+}$) ions only a single pump source would be required in some instances.

In addition, two or more different dopant ions may be incorporated into the same crystalline host. For example, chromium ions could be incorporated with iron ions in $TiO_2$ and $ZnWO_4$.

Where reference is made herein to the doping of the host material, it should be understood that the proportions are those within the knowledge of those skilled in the art to accomplish the results described. In general, the doping agent used with the host materials mentioned herein is approximately 1% by volume of the host material.

I claim as my invention:

1. Stimulated emission of radiation apparatus comprising a negative temperature medium capable of amplification by stimulated emission of radiation, said material having at least three discrete energy levels as a result of host crystalline field and fields of the paramagnetic ions and being in the form of separate physical pieces having their optic axes at random orientation, means for producing a magnetic field in said material of sufficient intensity to produce splitting of the energy levels, means for pumping said medium for creating a plurality of negative temperatures in said material, means for coupling into said material signal energy to be amplified at frequencies corresponding to negative temperatures of said material and means for extracting amplified wave energy from said material.

2. The combination as set forth in claim 1 in which said medium is in powdered form, and the pumping power supplied to said medium is of such magnitude as to create negative temperatures between energy levels covering a band of frequencies, means for supplying to said medium signal frequencies to be amplified corresponding to the differences in said energy levels, and means for extracting amplified wave energy from said medium.

3. The combination as set forth in claim 1 in which said negative temperature medium is rutile doped with iron and chromium ions.

4. The combination as set forth in claim 1, in which said medium is zinc tungstate doped with iron and chromium ions.

5. Stimulated emission of radiation apparatus comprising a mixture of at least two polycrystalline negative temperature media, each of said media having at least three discrete energy levels as a result of host crystalline field and electron field of the paramagnetic ions, means for immersing said media in an external magnetic field, means for pumping said media to induce enough transisitions from lower energy levels to higher energy levels to create negative temperatures in each of said media between energy levels corresponding to a plurality of frequencies, means for supplying to said media signal frequencies to be amplified and means for extracting amplified wave energy from said media.

6. The combination as set forth in claim 5 in which said magnetic field is of sufficient intensity to produce splitting of the energy levels, means for pumping said materials for inducing enough transitions from lower energy levels to higher energy levels to create negative temperatures between energy states corresponding to a plurality of frequencies, means for supplying to said materials signal frequencies to be amplified and means for extracting amplified wave energy from said materials.

7. Maser apparatus as set forth in claim 1 in which said negative temperature medium is iron-doped rutile.

8. Maser apparatus as set forth in claim 5, in which said mixture of media includes iron-doped rutile ($TiO_2$) and iron-doped zinc tungstate ($ZnWO_4$).

9. Maser apparatus as set forth in claim 5, in which said mixture of media includes one or more of the group consisting of $MgWO_4$, $CdWO_4$ and $CaWO_4$ doped with $Fe^{3+}$ ions.

10. Maser apparatus as set forth in claim 5, in which said mixture of media includes at least two of the group comprising $TiO_2$, $ZnWO_4$, $MgWO_4$, $CdWO_4$, and $CaWO_4$, doped with $Fe^{3+}$ ions and $TiO_2$ and $ZnWO_4$ doped with iron and chromium ions.

11. Stimulated emission of radiation apparatus as set forth in claim 1 in which said negative temperature medium is selected from a group having zero-field energy level characteristics substantially like those of a group including $MgWO_4$:$Fe^{3+}$, $CdWO_4Fe^{3+}$, $CdWO_4$:$Fe^{3+}$, $TiO_2$:$Fe^{3+}$, $ZnWO_4$:$Fe^{3+}$, $TiO_2$:$Fe^{3+}$:$Cr^{3+}$, and $ZnWO_4$:$F^{3+}$:$Cr^{3+}$.

References Cited

UNITED STATES PATENTS 3,366,887  1/1968  Sabisky et al. _____ 330—4

OTHER REFERENCES

Sabisky et al. "Proc. IEEE," January 1963, pp. 53–56.

JOHN KOMINSKI, *Primary Examiner.*

DARWIN R. HOSTETTER, *Assistant Examiner.*

U.S. Cl. X.R.

330—56